United States Patent [19]
Werner

[11] 3,952,785
[45] Apr. 27, 1976

[54] LOCKNUT

[75] Inventor: Adalbert Werner, Plettenberg, Germany

[73] Assignee: The Lamson & Sessions Co., Cleveland, Ohio

[22] Filed: Dec. 2, 1974

[21] Appl. No.: 528,848

[30] Foreign Application Priority Data
May 30, 1974  Germany............................ 2425897

[52] U.S. Cl. .............................. 151/21 B; 10/86 A
[51] Int. Cl.² ...................................... F16B 39/284
[58] Field of Search .................. 151/21 B; 10/86 A

[56] References Cited
UNITED STATES PATENTS

| | | | |
|---|---|---|---|
| 675,740 | 6/1901 | Keen ................................. | 151/21 B |
| 1,903,921 | 4/1933 | Rupf................................. | 151/21 B |
| 3,455,361 | 7/1969 | Zimmer et al..................... | 151/21 B |
| 3,456,704 | 7/1969 | Johnson ........................... | 151/21 B |
| 3,457,979 | 7/1969 | Munro............................... | 151/21 B |

*Primary Examiner*—Marion Parsons, Jr.

[57] ABSTRACT

An improved locknut has a hexoganal body with a threaded central opening. The threaded central opening has noncircular lock thread convolutions with a reduced pitch. Standard thread convolutions are disposed adjacent to the bottom of the opening to facilitate engagement with the mating thread. To form the lock thread convolutions, a hexagonal nut is moved through a nip between a pair of rotating externally toothed indenting wheels. As the nut passes through this nip, crest portions of the teeth on the indenting wheels move into engagement with opposite flat side surfaces of the nut body. As the nut body continues to move through the nip, the externally toothed wheels indent the nut body at spaced-apart locations. To promote accurate control of the axial extent of the lock thread convolutions, the external teeth on the indenting wheels have a tooth depth which is greater than the depth of the indentations formed in the opposite sides of the nut. This prevents deformation of the nut body by the root portions of the indenting teeth. The indenting teeth extend at an acute angle to the axis of rotation of the wheels to form the indentations with sloping inner surfaces.

12 Claims, 10 Drawing Figures

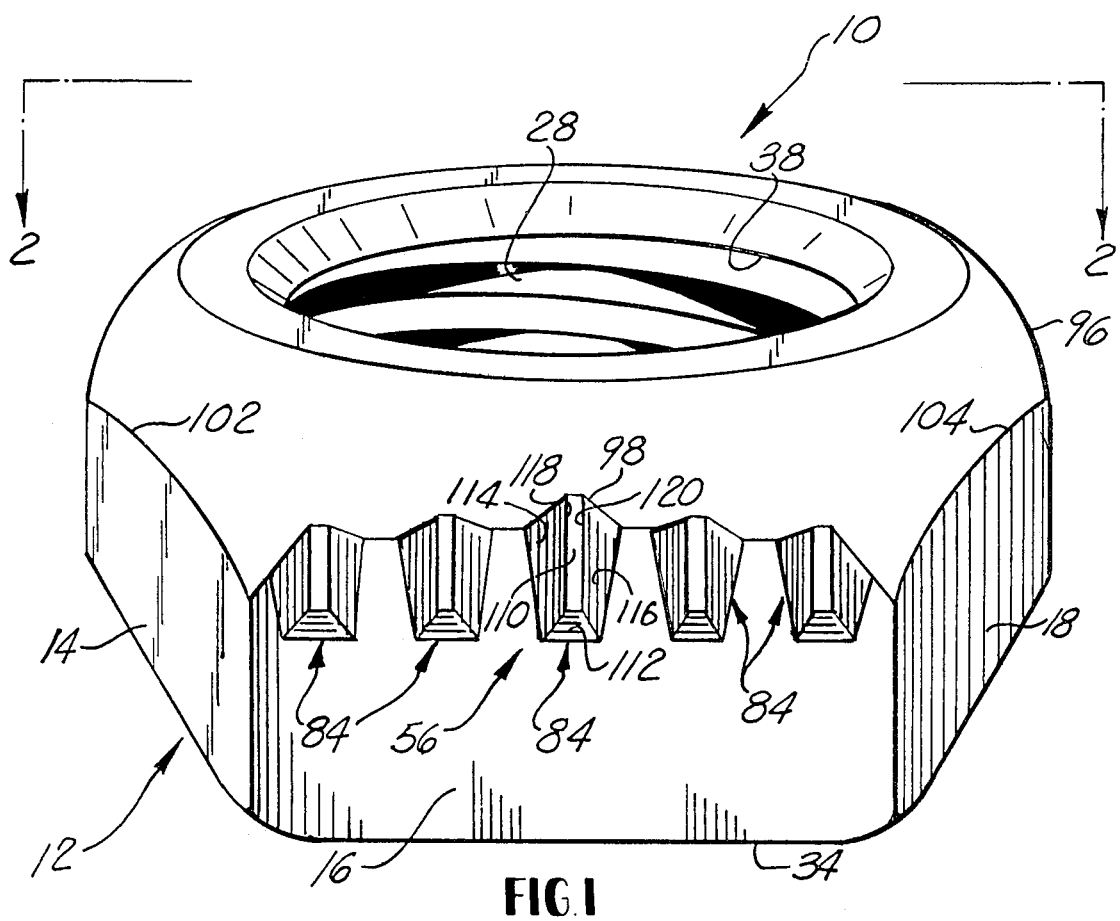
FIG.1
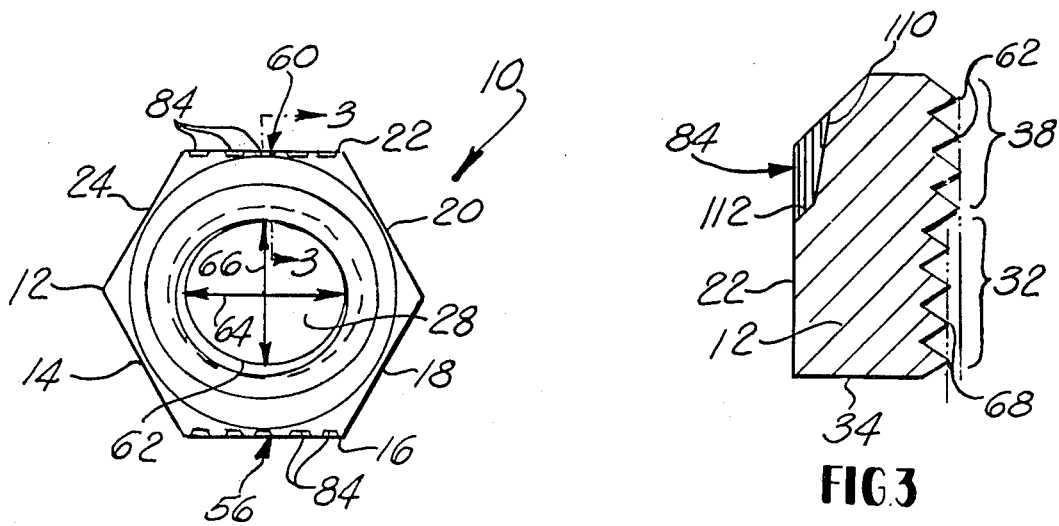
FIG.2
FIG.3

LOCKNUT

BACKGROUND OF THE INVENTION

Locknuts of the prevailing torque type have previously been made by compressing opposite sides of the locknuts with plain rotatable forming wheels. As this is done, standard circular thread convolutions are forced radially inwardly to form lock thread convolutions. A machine for forming locknuts in this manner is disclosed in U.S. Pat. No. 2,464,728. Although locknuts made in this manner have been generally satisfactory in operation, under certain circumstances it is more desirable to provide accurate control of the axial extent of the lock thread convolutions.

Controlling of the axial extent of the lock thread convolutions has previously been done by forming nuts with special internally threaded collars which are deformed in the manner disclosed in U.S. Pats. No. 3,354,926 and 3,352,342. However for economic and other reasons, the forming of a locknut in the manner described in these patents has been somewhat unsatisfactory. This has resulted in a disclosure, in U.S. Pat. No. 3,457,979, of a locknut having punched indentations in side surfaces of the locknut.

SUMMARY OF THE PRESENT INVENTION

The present invention provides an improved locknut having a body with a central threaded opening. A series of indentations are formed in opposite flat side surfaces of the nut body to form noncircular lock thread convolutions adjacent to one end of the nut body. These lock thread convolutions have a foreshortened pitch. The thread convolutions adjacent to the opposite end of the nut body have a circular configuration and are designed to have noninterferring engagement with a standard mating thread.

The improved locknut is made by moving a nut through a nip defined between the crest portions of external teeth on a pair of rotating wheels. As the nut moves through the nip, the opposite flat side surfaces of the nut body are indented at spaced-apart locations by the external teeth on the wheels to form a series of spaced-apart indentations. The forming of these indentations distorts the nut to form noncircular locking thread convolutions. Since a relatively small volume of metal is moved in making the indentions, the axial extent of the lock thread convolutions can be accurately controlled.

In addition, the angular placement of the form of the teeth on the face of the pair of rotating wheels causes a foreshortening of the lineal pitch of the nut threads, enhancing the prevailing torque characteristics of the noncircular locking thread convolutions.

Accordingly, it is an object of this invention to provide a new and improved locknut having a plurality of indentations in opposite side surfaces to accuraty form lock thread convolutions having a desired axial extent.

Another object of this invention is to provide a new and improved method of making a locknut by indenting opposite flat side surfaces of a nut body at spaced-apart locations with external teeth on rotating wheels to form a series of spaced-apart indentations in the opposite side surfaces of the nut body.

BRIEF DESCRIPTION OF THE DRAWINGS

The foregoing and other objects and features of the present invention will become more apparent upon a consideration of the following description taken in connection with the accompanying drawings wherein:

FIG. 1 is an enlarged pictorial depiction of a locknut constructed in accordance with the present invention;

FIG. 2 is a plan view, taken on a reduced scale along the line 2—2 of FIG. 1, illustrating the relationship between noncircular locking thread convolutions and indentations formed in opposite sides of the locknut;

FIG. 3 is an enlarged sectional view, taken generally along the line 3—3 of FIG. 2, illustrating the axial extent of noncircular lock thread convolutions to circular standard thread convolutions; and the foreshortening of the threads in the upper portion of the nut body.

DESCRIPTION OF ONE SPECIFIC PREFERRED EMBODIMENT OF THE INVENTION

Figure 4:
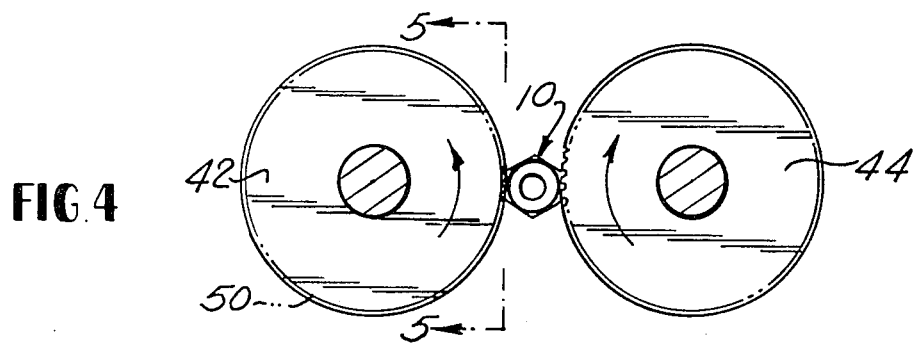
FIG. 4 is a schematic illustration depicting the forming of the noncircular lock thread convolutions by indenting opposite sides of the nut body with a pair of rotating wheels.

A locknut 10 constructed in accordance with the present invention has a hexagonally shaped body 12 (see FIGS. 1 and 2) with flat side surfaces 14, 16, 18, 20, 22 and 24. The locknut body 12 has a threaded central opening 28. Circular standard thread convolutions 32 (see FIG. 3) are formed in a portion of the opening 28 adjacent to a bottom surface 34 of the locknut 10 to facilitate initial engagement of the locknut with an externally threaded member. Noncircular and reduced pitch lock thread convolutions 38 are formed adjacent to the top of the locknut 10. The noncircular lock thread convolutions 38 have a generally elliptical configuration (see FIG. 2) and a pitch which is less than the pitch of the thread convolutions 32.

Figure 5:
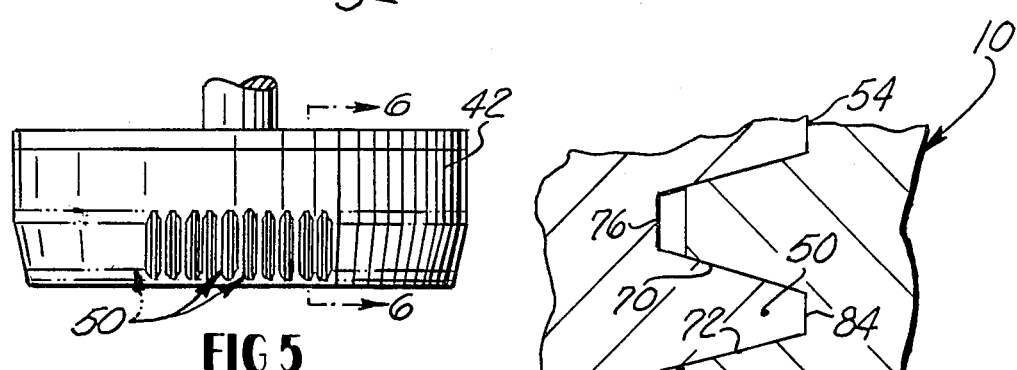
FIG. 5 is an elevational view, taken generally along the line 5—5 of FIG. 4, illustrating the configuration of teeth formed on one of the indenting wheels.
Figure 6:
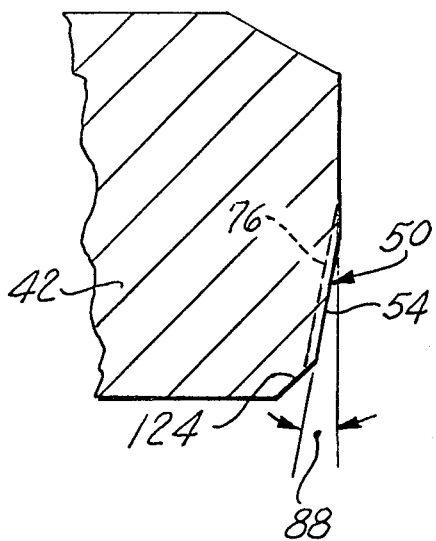
FIG. 6 is an enlarged sectional view, taken generally along the line 6—6 of FIG. 5, further illustrating the construction of one of the externally toothed indenting wheels of FIG. 4.

In accordance with a feature of the present invention, the lock thread convolutions 38 are accurately formed with a predetermined axial extent by indenting opposite side surfaces 16 and 22 of the nut body 12. The lock thread convolutions 38 are formed by passing a nut through a nip between a pair of identical externally toothed indenting wheels 42 and 44. As the nut 10 passes through the nip, an annular array of external teeth 50 (see FIGS. 5 and 6) on the periphery of the indenting wheel 42 engage a flat side surface 16 of the nut body 12 in the manner illustrated in FIG. 7. In addition, an annular array of teeth on the indenting wheel 44 engage the opposite side 22 of the nut body 12.

The teeth 50 on the indenting wheel 42 have crest portions 54 which plastically displace the metal of the nut body 12 to form a linear series 56 of indentions (see FIG. 1) across the upper portion of the side surface 16. As the indentations 56 are formed, the upper most thread convolutions are plastically deformed radially inwardly and downwardly with the resulting formation of the lock thread convolutions 38. Although only the teeth 50 on the indenting wheel 42 have been shown in FIGS. 5-7, it should be understood that the indenting wheel 44 is of the same construction as the indenting wheel 42 and has teeth of the same configurations. The teeth on the indenting wheel 44 engage the opposite side surface 22 of the nut body 12 to form a second series 60 of indentations in the nut body as the nut passes through the nip between the two wheels.

The inward deformation of opposite sides of the nut body 12 by the two indenting wheels 42 and 44 results in the formation of lock thread convolutions 38 having generally elliptical crest portions 62. It should be noted that the major axis 64 (see FIG. 2) of the elliptical crests 62 extends parallel to the two side surfaces 16 and 20 and the linear arrays of indentations 56 and 60 (see FIG. 2). The minor axis 66 of the elliptical lock thread convolutions 38 extends perpendicular to the two side surfaces 16 and 22. The elliptical crests 62 of the lock thread convolutions 38 have a distance between crests which is less than the distance between the circular crests 68 of the standard thread convolutions 32. This reduced pitch of the lock thread convolutions 38 promotes interference between the flanks of the lock thread convolutions and a standard mating external thread convolution.

Figure 9:
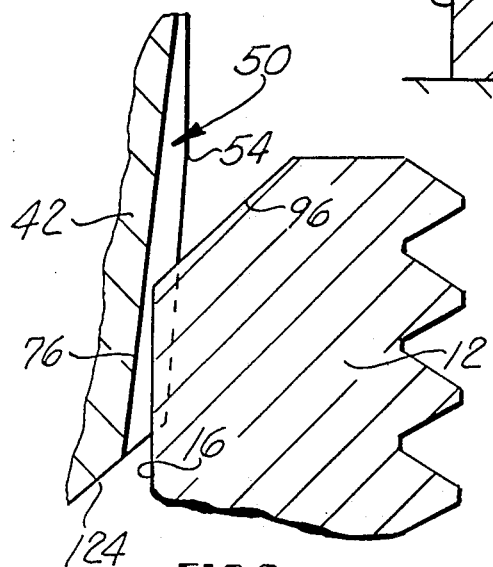
FIG. 9 is a sectional view, taken generally along the line 9—9 of FIG. 7, illustrating the relationship between a flat side surface of a nut body and the root of an external tooth on an indenting wheel during the formation of indentations in the nut body.

The external teeth on the two indenting wheels 42 and 44 have a tooth depth which is greater than the depth of the indentations formed in the nut body 12. Therefore, each indentation of the series 56 and 60 of indentations is formed only by the crest 54 (see FIG. 7) and flank surfaces 70 and 72 on an external tooth on the indenting wheels 42 and 44 the roots 76 of the teeth 50 are at all times spaced from the side surface 16 of the nut body 12 (see FIGS. 7 and 9).

By deforming the nut body with only the crest and flanks of the indenting teeth 50, the volume of metal which is displaced by the indenting wheels 42 and 44 is minimized. By minimizing the volume of displaced metal while obtaining the desired radial and axial displacement of the lock thread convolutions 38, the axial extent of the lock thread convolutions can be accurately controlled. The indenting teeth 50 have a crest width 80 (FIG. 7) which is wide enough to transmit the forces necessary to form the indentations and deform the locking thread convolutions 38 to be concentrated at the crest of the tooth.

As a nut enters the nip of the two indenting wheels 42 and 44, the teeth on the indenting wheels engage the leading edge portion of the two side surfaces 16 and 22. Since the indenting wheel 42 is rotating in a counterclockwise direction while the indenting wheel 44 is rotating in a clockwise direction (as viewed in FIG. 4) the external teeth on the indenting wheels tend to move the nut forwardly through the nip.

Figure 7:
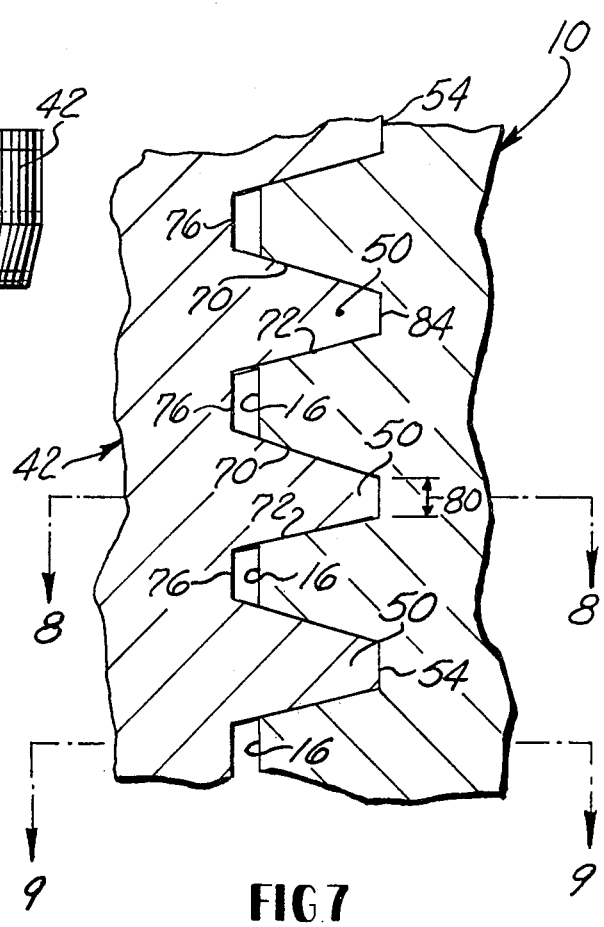
FIG. 7 is an enlarged fragmentary sectional view illustrating the relationship of the external teeth on one of the indenting wheels and the body of a nut as indentations are formed in the nut by the indenting wheel.

As one of the teeth 50 on the indenting wheel 42 engages the nut, the crest 54 of the tooth is pressed against the flat side surface 16. As the nut continues to enter the converging nip between the two indenting wheels 42 and 44, extremely high pressure forces are applied by the crest 54 of the tooth 50 to the nut body to initiate the formation of an indentation 84 (FIG. 7). The metal which is displaced as the indentation 84 is formed causes a plurality of turns of the standard thread convolutions to be deflected inwardly and downwardly due to the angle 88, FIG. 8. The inward deflection of the standard thread convolutions gives the lock thread convolutions 38 the elliptical configuration of FIG. 2. The downward deflection of the standard thread convolutions gives the lock thread convolutions 38 a pitch, that is the axial distance between adjacent crests 62, which is smaller than the pitch of the standard thread convolutions 32. Of course, the number of turns deflected inwardly is determined by the longitudinal extent of the indentation 84 (see FIG. 5).

As the nut continues to move through the nip between the indenting wheels 42 and 44, additional teeth 50 on the indenting wheel 42 engage the side 16 of the nut so that a series of indentations is formed. Each indentation 84 formed by the teeth 50 of the wheel 42 is spaced apart from the next adjacent indentation by a flat area of the side surface 16. The space between indentations has a width which is smaller than the width of an indentation 84 as measured in the plane of the surface 16. In one specific preferred embodiment of the invention, the teeth 50 had a pitch greater than the pitch of the thread convolutions 32. The teeth 50 were pressed into the nut body 12 past the pitch circle depth. This indentation spacing between indentations tends to minimize the amount of metal displaced as the nut passes through the nip so that the axial extent to which the outer thread convolutions are deflected can be accurately controlled.

As the nut passes into the diverging portion of the nip between the two indenting wheels 42 and 44, the teeth 50 on the indenting wheel 42 move out of the indentations 84 formed in the side 16 of the nut. It should be noted that the flank angle of the teeth 50 should be sufficient to prevent interference between the corners at the crest of the teeth and the sides of the indentations 84 as the nut moves out of the nip.

Figure 8:
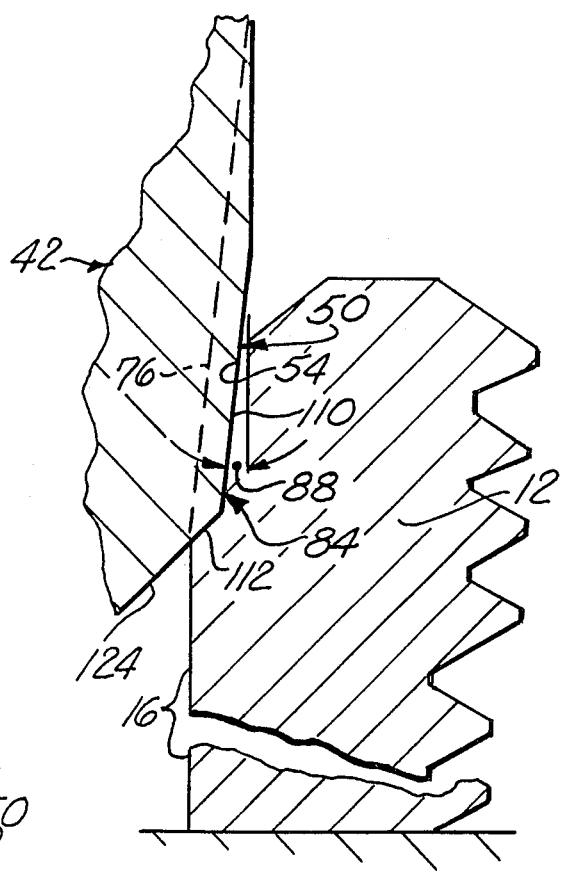
FIG. 8 is a sectional view, taken generally along the line 8—8 of FIG. 7, depicting the relationship between an indentation and crest portion of an external tooth of an indenting wheel.

The crests 54 of the teeth 50 on the indenting wheel 42 extend at an acute angle, indicated at 88 in FIG. 8, relative to a vertical axis which is parallel to the axis of rotation of the wheel 42. Therefore, the crests 54 of the teeth 50 move along a frusto-conical plane as the wheel 42 is rotated. The angled crests 54 of the teeth 50 result in the axially downward deformation of the threads at the crown end of the nut body 12 to provide the lock thread convolutions 38 with a pitch which is less than the pitch of the standard thread convolutions 32.

In one specific preferred embodiment of the invention, the acute angle 88 was approximately 10° to facilitate the slip of the nut body needed to foreshorten pitch as well as concomitantly producing the oval locking section. The angle 88 is of a sufficient magnitude to prevent the occurrence of a self-locking condition between the crests 54 of the teeth 50 and an inner surface 110 of the indentation 84. Therefore, the metal at a point on the surface of the nut body 12 is moved inwardly and downwardly by the teeth 50 with a resulting flow of metal to ovalize and foreshorten the thread convolutions 38. It should be understood that the crests 54 could be disposed at an angle other than the one foregoing specific preferred angle.

Due to the upward and radial outward slope of the crest 54 of the tooth 50, when the crest 54 of the tooth 50 engages the side 16 of the nut 12, the crest 54 forces the nut downwardly against a horizontal support surface 92. Although the configuration of only the teeth 50 on the indenting wheel 42 have been illustrated, it should be understood that the teeth on the indenting wheel 44 are of the same configuration and have the same orientation as the teeth 50 on the indenting wheel 42. Therefore, the nut 12 is pressed firmly downwardly against the support surface 92 by the teeth on the two indenting wheels 42 and 44 as the nut passes through nip between the indenting wheels.

Figure 10:
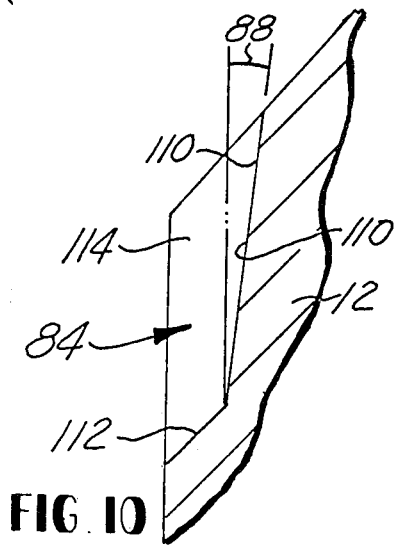
FIG. 10 is an enlarged sectional view of one of the indentations.

The indentations 84 of the series of indentations 56 are disposed relatively close to the upper portion of the flat side surface 16 (see FIG. 1). Therefore, the indentations 56 extend from the flat side surface into the crown portion 96 of the nut body 12. This is perhaps best seen in FIG. 1 wherein the open outer or upper end portions 99 of the indentations 56 are disposed above the arcuate lines 102 and 104 of intersection of the side surfaces 14 and 18 with the crown 96 which forms a portion of a generally spherical surface. Of course as an indentation 84 extends into the crown 96, the depth of the indentation tends to descrease (see FIG. 10). However, the rate at which the depth of the indentation 84 decreases is reduced due to the fact that the teeth 50 slope or slant inwardly at the acute angle 88 (see FIG. 8).

The roots 76 of the teeth 50 also slant inwardly at an angle 88. However, the tooth depth is sufficient so that the roots 76 of a tooth 50 does not engage the nut body 12 (see FIG. 9). Therefore, all of the metal which is displaced by the indenting roll 42 is moved under the influence of the teeth 50. If the teeth 50 were relatively shallow, the root 76 would engage the body of the nut. This would result in the displacement of a relatively large volume of metal to obtain a desired deflection and locking torque characteristic of the thread convolutions 38. When a relatively large volume of metal is displaced in this manner, it is difficult to control the axial extent of the locking thread convolutions 38.

Although the axial extent of each indentation 84 of the series of indentations varies depending upon the location of the indentation in the side of the nut (see FIG. 1), all of the indentations have the same basic configuration. This is because the indenting teeth 50 on the wheel 42 all have the same configuration. Each indentation 84 has a flat inner surface 110 (FIGS. 1 and 10) which extends inwardly and upwardly from a sloping bottom surface 112. The inner surface 110 is formed by the crest 54 of the tooth 50 and slopes inwardly toward the central axis of the opening 28 at an angle equal to the angle of inclination 88 of the crest 54 of an indenting tooth 50 (see FIG. 8).

Each indentation 84 has sloping side walls 114 and 116 (FIG. 1) which intersect the flat inner surface 110. The line of intersection 118 of the side surface 114 with the inner surface 110 extends straight upwardly until the indentation passes into the crown portion 96 of the nut body 12. The line intersection 118 then curves inwardly as the depth of the side surface 114 decreases in the crown portion of the nut. Of course, the side surface 116 has a line of intersection 120 with the inner surface 110 which is of a similar configuration to that of the line of intersection 118 of the side surface 114 with the inner surface 110.

The side surfaces 114 and 116 extend at an acute angle to the inner surface 110. This angular relationship between the two side surfaces 114 and 116 results in the fact that they are formed by the flanks 70 and 72 of the indenting teeth 50 (see FIG. 7). The angle of inclination of the side surface 114 relative to the inner surface 110, measured along an arcuate angle disposed on the inside of the indentation 84, is equal to the flank angle of the indenting teeth 50.

The teeth 50 are formed with an inwardly and downwardly sloping end surface 124 (see FIG. 8). This sloping end surface 124 forms the sloping bottom surface 112 (see FIG. 10) of the indentation 84. Of course, the sloping surface 124 tends to press the nut body 12 firmly against the horizontal support surface 92 as the nut body 12 passes through the nip between the two indenting rolls 42 and 44.

Although each of the indentations 84 has a different axial length due to the fact that the teeth 50 move out of the arcuately curved crown surface 96 at different radial distances from the center of the nut body 12, the bottom surface 112 of each indentation 84 intersects the flat side surface 16 of the nut body 12 along a straight line which extends parallel to the bottom surface of the nut (see FIG. 1). This is due to the fact that the sloping end surfaces of each of the indenting teeth 50 are equally spaced from the horizontal support surface 92 and are rotating about a vertical axis as the nut passes through the nip. Since the bottom surfaces 112 of the indentation 84 are disposed the same distance from the bottom of the nut body 12, each of the indentations 84 tends to deflect the nut body 12 to the same axial extent along the opening 28 to facilitate controlling the axial extent of the locking thread convolutions 38.

In view of the foregoing description, it can be seen that accurate control of the extent of the locking thread convolutions 38 of the locknut 10 could be obtained by forming a series of indentations 56 and 60 on opposite side surfaces 16 and 22 of the locknut 10. The two series of indentations 56 and 60 are simultaneously formed by the indenting wheels 42 and 44 as a nut passes through the nip between the two wheels. Although only the teeth 50 for the indenting wheel 42 have been illustrated in FIGS. 5 and 6, it should be understood that the indenting wheel 44 has the same shape and configuration as the indenting wheel 42 and each of the indentations in the series 60 of indentations has the same configuration as each of the indentations in the series 56 of indentations.

Having described one specific preferred embodiment of the invention, the following is claimed:

1. A locknut comprising a metallic nut body having a plurality of intersecting side surfaces, an arcuate crown end portion extending between said side surfaces at one end of said nut body, and a bottom end portion extending between said side surfaces at an end of said nut body opposite from said one end, said nut body defining a threaded central opening with noncircular thread convolutions adjacent to the crown end portion of said nut body to interfere with a mating thread convolution and circular thread convolutions adjacent to said bottom end portion of said nut body to freely engage the mating thread convolution, said noncircular thread convolutions being formed by plastically displacing the metal of the nut body to form a plurality of series of longitudinally extending indentations in a pair of side surfaces disposed on opposite sides of said nut body, each series of indentations extending from one edge portion of an associated side surface of said nut body to the opposite edge portion of the associated side surface of said nut body, each of said indentations having an end surface which extends inwardly and upwardly from the associated side surface of the nut body at a location adjacent to an axially inner end of said noncircular thread convolutions and between said crown and bottom end portions, a substantially flat inner surface which extends upwardly from said end surface and intersects said crown end portion of the nut body, said inner surface sloping inwardly toward the central axis of the threaded opening so that said indentation has a first depth adjacent to said end surface and a second depth which is greater than said first depth at a location spaced apart from said end surface to provide for greater noncircularity of the noncircular thread convolutions adjacent to said crown end portion of the nut body than adjacent to the axially inner end of the noncircular thread convolutions, and a pair of side surfaces which intersect said end surface and said inner surface and diverge outwardly from said inner surface so that said indentation has a first width at the intersections of said side surfaces and said inner surfaces and a second width which is greater than said first width at the intersection of said indentation side surfaces and the associated one of said body side surfaces, each of the end surfaces of a series of indentations intersecting the associated one of said body side surfaces along a line extending parallel to said bottom end of said nut body, at least a central one of said indentations of a series of indentations having an inner surface which is longer than the inner surface of another one of said indentations of the series of indentations.

2. A locknut as set forth in claim 1 wherein said end surface of each of said indentations extends at an obtuse angle to the plane of said inner surface.

3. A locknut as set forth in claim 1 wherein each indentation of one of said series of indentations is separated from a next adjacent indentation by a portion of the associated side surface of said nut body.

4. A locknut as set forth in claim 3 wherein said portion of the side surface between adjacent indentations has a width which is less than the width of said adjacent indentations.

5. A locknut as set forth in claim 1 wherein said noncircular thread convolutions have a foreshortened pitch.

6. A locknut as set forth in claim 1 wherein said flat inner surface of each of said indentations extends at an angle of 10° relative to the central axis of said opening.

7. An internally threaded locknut adapted to engage a standard thread convolution on an externally threaded member, said locknut comprising a metallic nut body having a plurality of intersecting side surfaces, an arcuate crown end portion extending between said side surfaces at one end of said nut body, and a bottom end portion extending between said side surfaces at an end of said nut body opposite from said one end, said nut body defining a threaded central opening with noncircular thread convolutions adjacent to the crown end portion of said nut body to interfere with a mating standard thread convolution and circular thread convolutions adjacent to said bottom end portion of said nut body to freely engage the mating standard thread convolution, said noncircular thread convolutions having a pitch which is less than the pitch of the standard thread convolution on the externally threaded member, said circular thread convolutions having a pitch which is substantially equal to the pitch of the standard thread convolution on the externally threaded member, a plurality of series of longitudinally extending indentations in a pair of side surfaces disposed on opposite sides of said nut body to plastically deform said nut body and thereby form said noncircular thread convolutions, each series of indentations extending from one edge portion of an associated side surface of said nut body to the opposite edge portion of the associated side surface of said nut body with the central axis of each indentation of the series of indentations extending parallel to the central axis of said threaded central opening, each of said indentations being formed by plastically deforming the metal of said nut body and having an end surface which extends inwardly from the associated side surface of the nut body at a location between said crown and bottom end portions and an inner surface portion which extends axially upwardly from said end surface, each of said inner surface portions sloping inwardly toward the central axis of the threaded opening so that each of said indentations has a first depth adjacent to said end surface and a second depth which is greater than said first depth at a location spaced apart from said end surface to plastically deform the metal of the nut body to a greater extent adjacent to said crown end portion of said nut body than to said end surface and reduce the pitch of said noncircular thread convolutions, each indentation of a series of indentations being separated from an adjacent indentation by a portion of the associated side surface of said nut body, at least a central one of said indentations of a series of indentations having an inner surface portion which is longer than the inner surface portion of one of said indentations which is adjacent to an edge portion of said nut body to provide for a greater deformation of the metal of said nut body adjacent to a central portion of a side surface of said nut body than adjacent to the edge portion of the side surface of said nut body.

8. A locknut as set forth in claim 7 wherein said inner surface portion of said indentation has a generally flat configuration, said end surface of said indentation intersecting said flat inner surface portion at an obtuse angle to the plane of said inner surface portion.

9. A locknut as set forth in claim 8 wherein said indentation further includes a pair of side surfaces which diverge outwardly from said flat inner surface portion so that said indentation has a first width at the intersections of said indentation side surfaces and said flat inner surface portion and a second width which is greater than the first width at the intersection of said indentation side surfaces and the associated one of said nut body side surfaces.

10. A locknut as set forth in claim 9 wherein each of the end surfaces of a series of indentations intersects the associated one of said body side surfaces along a straight line extending parallel to said botton end of said nut body.

11. A locknut as set forth in claim 10 wherein said flat inner surface portions of each indentation of a series of indentations intersects said crown end portion of said nut body.

12. A locknut comprising a metallic nut body having a plurality of intersecting side surfaces, an arcuate crown end portion extending between said side surfaces at one end of said nut body, and a bottom end portion extending between said side surfaces at an end of said nut body opposite from said one end, said arcuate crown end portion having arcuate lines of intersection with each of said side surface of said nut body to provide each of said side surfaces with a central portion which extends further upwardly from the bottom end portion of said nut body than do edge portions of the side surface, said nut body defining a threaded central opening with noncircular thread convolutions adjacent to the crown end portion of said nut body to interfere with a mating thread convolution and circular thread convolutions adjacent to said bottom end portion of said nut body to freely engage the mating thread convolution, said non-circular thread convolutions being formed by plastically displacing the metal of the nut body to form a plurality of series of longitudinally extending indentations in a pair of side surfaces disposed on opposite sides of said nut body, each series of indentations extending from one edge portion of an associated side surface of said nut body to the opposite edge portion of the associated side surface of said nut body, each of said indentations having a central axis which extends parallel to the central axis of said central opening and being separated from a next adjacent indentation by a portion of a side surface of said nut body, each of said indentations having an end surface which extends inwardly from the associated side surface of the nut body at a location adjacent to an axially inner end of said noncircular thread convolutions and between said crown and bottom end portions, a substantially flat inner surface which extends upwardly from said end surface and intersects said crown end portion of the nut body to plastically displace the metal of said nut body along a section of the nut body which extends into said crown end portion of said nut body to provide for noncircular thread convolutions in said crown end portion of said nut body, said end surface extending at an obtuse angle to said flat inner surface, and a pair of side surfaces which intersect said end surface and said inner surface and diverge outwardly from said inner surface so that said indentation has a first width at the intersections of said side surfaces and said inner surfaces and a second width which is greater than said first width at the intersection of said indentation side surface and the associated one of said body side surfaces, each of the end surfaces of a series of indentations intersecting the associated one of said body side surfaces at a line of intersection which extends parallel to said bottom end of said nut body, one of said indentations of a series of indentations being disposed in the central portion of an associated side surface of said nut body and a flat inner surface which is longer than the flat inner surfaces of indentations which are disposed in the edge portions of the associated side surfaces of said nut body.

* * * * *